(12) United States Patent
Sasaki et al.

(10) Patent No.: US 10,059,800 B2
(45) Date of Patent: Aug. 28, 2018

(54) PROCESS FOR PRODUCING POLYCARBONATE

(71) Applicant: IDEMITSU KOSAN CO., LTD., Tokyo (JP)

(72) Inventors: Kenji Sasaki, Ichihara (JP); Masayuki Takahashi, Taipei (TW); Hiroaki Motegi, Shunan (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 15/534,995

(22) PCT Filed: Dec. 10, 2015

(86) PCT No.: PCT/JP2015/084730
§ 371 (c)(1),
(2) Date: Jun. 9, 2017

(87) PCT Pub. No.: WO2016/093331
PCT Pub. Date: Jun. 16, 2016

(65) Prior Publication Data
US 2017/0349704 A1     Dec. 7, 2017

(30) Foreign Application Priority Data
Dec. 12, 2014  (JP) ................................. 2014-252316

(51) Int. Cl.
*C08G 64/24* (2006.01)
*C08G 64/18* (2006.01)
*C08G 77/448* (2006.01)

(52) U.S. Cl.
CPC ........... *C08G 64/24* (2013.01); *C08G 64/186* (2013.01); *C08G 77/448* (2013.01)

(58) Field of Classification Search
USPC .......................................... 528/21, 196, 198
See application file for complete search history.

(56) References Cited

FOREIGN PATENT DOCUMENTS

| JP | H06-65364 A | 3/1994 |
|---|---|---|
| JP | H06-329781 A | 11/1994 |
| JP | H08-245780 A | 9/1996 |
| JP | 2002-356549 A | 12/2002 |
| JP | 2003-192781 A | 7/2003 |
| JP | 2005-008688 A | 1/2005 |

OTHER PUBLICATIONS

International Search Report for International Patent Application No. PCT/JP2015/084730 dated Mar. 8, 2016.

*Primary Examiner* — Terressa Boykin
(74) *Attorney, Agent, or Firm* — Foley & Lardner LLP (57) ABSTRACT

A method of producing a polycarbonate, including: introducing a tertiary amine into a reaction process; and performing interfacial polycondensation between an alkali aqueous solution of a dihydric phenol and phosgene in the presence of an organic solvent, in which: (i) a portion into which the tertiary amine is introduced comprises at least a tertiary amine storage tank, a tertiary amine supply pipe, and a diluent solvent supply pipe; (ii) the portion further includes a pressure control valve in the tertiary amine supply pipe on an upstream side of a merging portion with the diluent solvent supply pipe; and (iii) when a pressure $P_1$ of an inside of the tertiary amine storage tank pressurized by a pressurization gas and a pressure $P_2$ in a portion ranging from an outlet of the storage tank to an upstream side of the pressure control valve, a relationship of $P_1 \leq P_2$ is satisfied.

16 Claims, 4 Drawing Sheets

PROCESS FOR PRODUCING POLYCARBONATE

CROSS-REFERENCE TO RELATED APPLICATIONS

The present application is a U.S. national stage application of International Patent Application No. PCT/JP2015/084730, filed Dec. 10, 2015, which claims the benefit of priority to Japanese Patent Application No. 2014-252316, filed Dec. 12, 2014, the entireties of which are hereby incorporated by reference.

TECHNICAL FIELD

The present invention relates to a method of producing a polycarbonate, and more specifically, to a method of producing a polycarbonate by which a polymerization catalyst can be stably supplied into a reaction system when the polycarbonate is produced.

BACKGROUND ART

A polycarbonate is a polymer excellent in transparency, heat resistance, and impact resistance, and hence has been widely used as an engineering plastic in an industrial field at present.

With regard to a method of producing the polycarbonate, a method involving causing an aromatic dihydroxy compound, such as bisphenol A, and phosgene to directly react with each other (interfacial polymerization method) has been known as a method of producing a high-quality polycarbonate. The following method has been adopted as an industrial production method for a polycarbonate based on the interfacial polymerization method (see Patent Documents 1 and 2). An alkali aqueous solution of a bisphenol and phosgene are caused to react with each other in the presence of an organic solvent to produce a polycarbonate oligomer having a reactive chloroformate group, and simultaneously or sequentially with the production of the polycarbonate oligomer, a condensation reaction (polymerization reaction) between the polycarbonate oligomer and the bisphenol is further advanced in the presence of a polymerization catalyst, such as a tertiary amine, and the alkali aqueous solution.

Among the polycarbonates, a polycarbonate-polyorganosiloxane copolymer (hereinafter sometimes referred to as "PC-POS copolymer") obtained by copolymerization through the use of a polyorganosiloxane has been attracting attention because the copolymer has high impact resistance, high chemical resistance, and high flame retardancy. The copolymer has been expected to be widely utilized in various fields, such as the field of electrical and electronic equipment, and the field of an automobile. A polymerization catalyst, such as a tertiary amine, has been used at the time of the production of the polycarbonate for efficiently advancing a reaction (see Patent Document 3).

CITATION LIST

Patent Document

Patent Document 1: JP 06-65364 A
Patent Document 2: JP 08-245780 A
Patent Document 3: JP 06-329781 A

SUMMARY OF INVENTION

Technical Problem

When a polycarbonate is produced by an interfacial polymerization method, in a process for the production of a polycarbonate oligomer or a reaction process involving subjecting the polycarbonate oligomer and a dihydric phenol to a polycondensation reaction to produce the polycarbonate, the following has been performed: a liquid tertiary amine serving as a polymerization catalyst is diluted with a diluent solvent, and then the diluted product is introduced into the reaction process to accelerate the reaction. When the tertiary amine is introduced into the reaction process, the tertiary amine is introduced into the reaction process after having been supplied from a storage tank through a supply pipe to be mixed with the diluent solvent at a merging portion. The tertiary amine is often a combustible material, and is hence sometimes held under pressure after a gas in the tank has been replaced with an inert gas (e.g., nitrogen).

Part of the tertiary amine supply pipe is sometimes installed at a place higher than the liquid level of the tertiary amine storage tank depending on the design of a production apparatus, and hence the tertiary amine is sometimes introduced into the process after having been transferred in the tertiary amine supply pipe by utilizing its state of being held under pressure to be mixed with the diluent solvent at the merging portion. At this time, a pressurization gas, such as nitrogen, is dissolved in the tertiary amine, and hence the tertiary amine is transferred through the supply pipe in a state of having dissolved therein the pressurization gas.

When the tertiary amine passes the place higher than the liquid level of the tertiary amine storage tank where the tertiary amine supply pipe is installed, the pressure applied to the tertiary amine reduces. As a result, the following problem occurs. The dissolved pressurization gas is brought into a bubble state to be released from the inside of the tertiary amine, and hence a bubble accumulation occurs in the tertiary amine supply pipe to make it impossible to stably introduce a predetermined amount of the tertiary amine into the reaction process. When the predetermined amount of the tertiary amine cannot be stably introduced into the reaction process, the following problem occurs. In the reaction process, unevenness occurs in the reaction, and hence when a reaction liquid (emulsion solution) to be obtained from the polycondensation step is separated into an aqueous phase and an organic phase containing a polycarbonate resin, separability deteriorates to lead to poor production efficiency. In particular, in the case where a polycarbonate-polyorganosiloxane copolymer is produced as the polycarbonate, a larger amount of the polymerization catalyst than that in the case where a homopolycarbonate is produced is needed. In this case, when the predetermined amount of the tertiary amine cannot be introduced into the process, for example, the following problem occurs. A part of polyorganosiloxane still remain unreacted, and hence the unreacted polyorganosiloxane is incorporated into the polycarbonate-polyorganosiloxane copolymer to be obtained as a product to reduce its transparency.

An object of the present invention is to provide a method of producing a polycarbonate with satisfactory production efficiency by obtaining a reaction liquid (emulsion solution) having satisfactory separability through the suppression of the occurrence of unevenness in a reaction by the suppression of a fluctuation in supply amount of a tertiary amine to be used as a polymerization catalyst at the time of the production of the polycarbonate by the interfacial polymerization method. Another object of the present invention is to provide a method of producing a polycarbonate-polyorganosiloxane copolymer having a low content of an unreacted polyorganosiloxane at the time of the production of a polycarbonate-polyorganosiloxane copolymer as a polycarbonate.

Solution to Problem

The inventors of the present invention have made extensive investigations, and as a result, have found that the objects are achieved by controlling a pressure in a tertiary amine supply pipe even when the tertiary amine supply pipe is installed at a position higher than a tertiary amine storage tank at the time of the introduction of a tertiary amine from the inside of the tertiary amine storage tank pressurized by a pressurization gas into a reaction process for a polycarbonate through the use of the tertiary amine supply pipe. Thus, the inventors have completed the present invention.

That is, the present invention relates to the following items [1] to [16].

[1] A method of producing a polycarbonate, comprising:
introducing a tertiary amine as a polymerization catalyst into a reaction process; and
performing interfacial polycondensation between an alkali aqueous solution of a dihydric phenol and phosgene in the presence of an organic solvent,
wherein the tertiary amine is introduced into the reaction process so that the following (i) to (iii) may be satisfied:
(i) a portion into which the tertiary amine is introduced comprises at least a tertiary amine storage tank, a tertiary amine supply pipe, and a diluent solvent supply pipe from which a diluent solvent for the tertiary amine is supplied;
(ii) the portion further comprises a pressure control valve in the tertiary amine supply pipe on an upstream side of a merging portion with the diluent solvent supply pipe; and
(iii) when a pressure of an inside of the tertiary amine storage tank pressurized by a pressurization gas is represented by $P_1$ and a pressure in a portion ranging from an outlet of the storage tank to an upstream side of the pressure control valve is represented by $P_2$, a relationship of $P_1 \leq P_2$ is satisfied.

[2] The method of producing a polycarbonate according to Item [1], wherein the method of producing a polycarbonate comprises:
a step (a) of subjecting the alkali aqueous solution of the dihydric phenol and the phosgene to a phosgenation reaction in the presence of the organic solvent to provide a reaction liquid;
a step (b) of introducing the alkali aqueous solution of the dihydric phenol into the reaction liquid obtained from the step (a) to provide a reaction liquid containing a polycarbonate oligomer;
a step (c) of separating the reaction liquid containing the polycarbonate oligomer obtained from the step (b) into an aqueous phase and an organic solvent phase containing the polycarbonate oligomer; and
a step (d) of causing the organic solvent phase containing the polycarbonate oligomer separated in the step (c) and the alkali aqueous solution of the dihydric phenol to react with each other to provide a reaction liquid containing the polycarbonate.

[3] The method of producing a polycarbonate according to Item [2], wherein the tertiary amine is introduced as the polymerization catalyst into the step (d).

[4] The method of producing a polycarbonate according to Item [3], wherein the tertiary amine is further introduced as the polymerization catalyst into the step (b).

[5] The method of producing a polycarbonate according to any one of Items [1] to [4], wherein a purity of the tertiary amine in the tertiary amine storage tank is 90% or more.

[6] The method of producing a polycarbonate according to any one of Items [1] to [5], wherein the tertiary amine comprises triethylamine.

[7] The method of producing a polycarbonate according to any one of Items [1] to [6], wherein the diluent solvent comprises water or methylene chloride.

[8] The method of producing a polycarbonate according to any one of Items [1] to [7], wherein the pressurization gas comprises nitrogen or air.

[9] The method of producing a polycarbonate according to any one of Items [1] to [8], wherein a standard deviation of an amount of the tertiary amine supplied from the tertiary amine supply pipe is within 5% of an average flow rate thereof.

[10] The method of producing a polycarbonate according to any one of Items [1] to [9], wherein a concentration of the tertiary amine after mixing with the diluent solvent is 50 mass % or less.

[11] The method of producing a polycarbonate according to any one of Items [1] to [10], wherein the tertiary amine is transferred with a pump installed in the tertiary amine supply pipe at the outlet of the tertiary amine storage tank.

[12] The method of producing a polycarbonate according to any one of Items [2] to [11], wherein the step (d) comprises a step of causing the organic solvent phase containing the polycarbonate oligomer separated in the step (c), the alkali aqueous solution of the dihydric phenol, and a polyorganosiloxane to react with each other to provide a reaction liquid containing a polycarbonate-polyorganosiloxane copolymer.

[13] The method of producing a polycarbonate according to Item [12], wherein the tertiary amine is introduced into the step (d) at a mass ratio of from 0.001 to 0.1 with respect to the polyorganosiloxane.

[14] The method of producing a polycarbonate according to any one of Items [1] to [13], wherein the dihydric phenol comprises a dihydric phenol represented by the following general formula (1):

wherein $R^{11}$ and $R^{12}$ each independently represent a halogen atom, an alkyl group having 1 to 6 carbon atoms, or an alkoxy group having 1 to 6 carbon atoms, V represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or CO—, and a and b each independently represent an integer of from 0 to 4.

[15] The method of producing a polycarbonate according to any one of Items [12] to [14], wherein the polyorganosiloxane comprises at least one of polyorganosiloxane selected from the following general formulae (2), (3), and (4):

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ and/or $R^6$ may be identical to or different from each other, Y represents —$R^7$O—, —$R^7$COO—, —$R^7$NH—, —$R^7$N$R^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, Z represents a hydrogen atom or a halogen atom, and a plurality of Z may be identical to or different from each other, β represents a divalent group derived from a diisocyanate compound, or a divalent group derived from a dicarboxylic acid or a halide of a dicarboxylic acid, p and q each represent an integer of 1 or more, and the sum of p and q is from 20 to 500, and n represents an average number of repetitions of from 20 to 500.

[16] A method of producing a polycarbonate, comprising: introducing a tertiary amine as a polymerization catalyst into a reaction process; and performing interfacial polycondensation between an alkali aqueous solution of a dihydric phenol and phosgene in the presence of an organic solvent, wherein a fluctuation in flow rate when the tertiary amine is introduced into the reaction process is within 5% in terms of a standard deviation with respect to an average flow rate of the tertiary amine.

Advantageous Effects of Invention

According to the method of producing a polycarbonate of the present invention, the tertiary amine serving as the polymerization catalyst can be introduced into the reaction process while an amount of fluctuation in flow rate thereof is reduced. As a result, a reaction liquid (emulsion solution) having satisfactory separability is obtained and hence the polycarbonate can be efficiently produced. In addition, when a polycarbonate-polyorganosiloxane copolymer is produced as the polycarbonate, a polycarbonate-polyorganosiloxane copolymer having a low content of an unreacted polyorganosiloxane can be produced.

DESCRIPTION OF EMBODIMENTS

A method of producing a polycarbonate of the present invention comprises: introducing a tertiary amine as a polymerization catalyst into a reaction process; and performing interfacial polycondensation between an alkali aqueous solution of a dihydric phenol and phosgene in the presence of an organic solvent,
wherein the tertiary amine is introduced into the reaction process so that the following (i) to (iii) may be satisfied:
(i) a portion into which the tertiary amine is introduced comprises at least a tertiary amine storage tank, a tertiary amine supply pipe, and a diluent solvent supply pipe from which a diluent solvent for the tertiary amine is supplied;
(ii) the portion further comprises a pressure control valve in the tertiary amine supply pipe on an upstream side of a merging portion with the diluent solvent supply pipe; and
(iii) when a pressure of an inside of the tertiary amine storage tank pressurized by a pressurization gas is represented by $P_1$ and a pressure in a portion ranging from an outlet of the storage tank to an upstream side of the pressure control valve is represented by $P_2$, a relationship of $P_1 \leq P_2$ is satisfied.

The method of producing a polycarbonate of the present invention is described in detail below. In this description, a provision considered to be preferred can be arbitrarily adopted, and a combination of preferred provisions can be said to be more preferred.

The method of producing a polycarbonate of the present invention is a method of producing a polycarbonate, comprising: introducing a tertiary amine as a polymerization catalyst into a reaction process; and performing interfacial polycondensation between an alkali aqueous solution of a dihydric phenol and phosgene in the presence of an organic solvent, wherein a fluctuation in flow rate when the tertiary amine is introduced into the reaction process is within 5% in terms of a standard deviation with respect to the average flow rate of the tertiary amine.

The method of producing a polycarbonate of the present invention is performed by: introducing the tertiary amine as the polymerization catalyst into the reaction process; and performing the interfacial polycondensation between the alkali aqueous solution of the dihydric phenol and phosgene in the presence of the organic solvent. Raw materials, a reaction process, and the like at the time of the production of the polycarbonate by the interfacial polycondensation are described below.

[Raw Material]

<Alkali Aqueous Solution of Dihydric Phenol>

A dihydric phenol to be used in the production of a polycarbonate is used as the dihydric phenol. A dihydric phenol represented by the following general formula (1) is preferably used as the dihydric phenol:

(1)

in the general formula (1), $R^{11}$ and $R^{12}$ each independently represent a halogen atom, an alkyl group having 1 to 6 carbon atoms, or an alkoxy group having 1 to 6 carbon atoms, V represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or —CO—, and a and b each independently represent an integer of from 0 to 4.

The dihydric phenol represented by the general formula (1) is not particularly limited, but 2,2-bis(4-hydroxyphenyl) propane [trivial name: bisphenol A] is suitable. When only bisphenol A is used as the dihydric phenol, the polycarbonate can be turned into a homopolycarbonate produced by using bisphenol A. In addition, the polycarbonate can be turned into a branched polycarbonate produced by using bisphenol A through combined use of a branching agent with bisphenol A.

Examples of the dihydric phenol except bisphenol A include: bis(hydroxyaryl)alkanes, such as bis(4-hydroxyphenyl)methane, 1,1-bis (4-hydroxyphenyl)ethane, 2,2-bis (4-hydroxyphenyl)butane, 2,2-bis (4-hydroxyphenyl) octane, bis (4-hydroxyphenyl) phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl) propane, 2,2-bis(4-hydroxy-3,5-dichlorophenyl)propane, and 2,2-bis(4-hydroxy-3,5-dibromophenyl)propane; bis(hydroxyaryl)cycloalkanes, such as 1,1-bis(4-hydroxyphenyl) cyclopentane, 1,1-bis(4-hydroxyphenyl)cyclohexane, 1,1-bis(4-hydroxyphenyl)-3,5,5-trimethylcyclohexane, 2,2-bis (4-hydroxyphenyl)norbornane, and 1,1-bis(4-hydroxyphenyl)cyclododecane; dihydroxyaryl ethers, such as 4,4'-dihydroxydiphenyl ether and 4,4'-dihydroxy-3,3'-dimethylphenyl ether; dihydroxydiaryl sulfides, such as 4,4'-dihydroxydiphenyl sulfide and 4,4'-dihydroxy-3,3'-dimethyldiphenyl sulfide; dihydroxydiarylsulfoxides, such as 4,4'-dihydroxydiphenyl sulfoxide and 4,4'-dihydroxy-3,3'-dimethyldiphenyl sulfoxide; dihydroxydiaryl sulfones, such as 4,4'-dihydroxydiphenyl sulfone and 4,4'-dihydroxy-3,3'-dimethyldiphenyl sulfone; dihydroxydiphenyls, such as 4,4'-dihydroxydiphenyl; dihydroxydiarylfluorenes, such as 9,9-bis(4-hydroxyphenyl)fluorene and 9,9-bis(4-hydroxy-3-methylphenyl)fluorene; dihydroxydiaryladamantanes, such as 1,3-bis(4-hydroxyphenyl)adamantane, 2,2-bis(4-hydroxyphenyl)adamantane, and 1,3-bis(4-hydroxyphenyl)-5, 7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentane.

Those dihydric phenols may be used alone or as a mixture thereof.

The dihydric phenol is used as an alkali aqueous solution, and an alkali to be used at this time may be, for example, an alkali hydroxide, in particular, a strongly basic hydroxide, such as sodium hydroxide or potassium hydroxide. In normal cases, an alkali aqueous solution having an alkali concentration of from 1 mass % to 15 mass % is preferably used as the alkali aqueous solution. In addition, the content of the dihydric phenol in the alkali aqueous solution is typically selected from the range of from 0.5 mass % to 20 mass %.

<Phosgene>

Phosgene is a compound obtained by causing chlorine and carbon monoxide to react with each other at a ratio of carbon monoxide of typically from 1.01 mol to 1.3 mol with respect to 1 mol of chlorine through the use of activated carbon as a catalyst. When a phosgene gas is used, a phosgene gas containing about 1 vol % to about 30 vol % of unreacted carbon monoxide in the phosgene to be used can be used. Phosgene in a liquefied state can also be used.

<Organic Solvent>

An example of the organic solvent is a solvent that dissolves a polycarbonate oligomer and a polycarbonate resin. Specific examples thereof include halogenated hydrocarbon solvents, such as dichloromethane (methylene chloride), dichloroethane, trichloroethane, tetrachloroethane, pentachloroethane, hexachloroethane, dichloroethylene, chlorobenzene, and dichlorobenzene, and dichloromethane (methylene chloride) is particularly preferred.

<Tertiary Amine>

The tertiary amine is used as the polymerization catalyst in the reaction process at the time of the production of the polycarbonate. The tertiary amine to be used in the method of producing a polycarbonate of the present invention is liquid, and specific examples of the tertiary amine include triethylamine, tributylamine, N,N-dimethylcyclohexylamine, pyridine, and dimethylaniline. Those tertiary amines may be used alone or in combination thereof. Among the tertiary amines, triethylamine is particularly suitable. A tertiary amine having a purity of 90% or more is preferably used as the polymerization catalyst.

<Diluent Solvent>

When the tertiary amine is used in the reaction process, the tertiary amine is used after having been diluted with a diluent solvent. Examples of the diluent solvent may include water and methylene chloride. The tertiary amine is preferably used after having been diluted with the diluent solvent, such as water or methylene chloride, to have a concentration of 50 mass % or less. When the tertiary amine is used after having been diluted to have a concentration of 50 mass % or less, the adjustment of the amount of the tertiary amine to be introduced as a catalyst into the reaction process is facilitated.

[Production of Polycarbonate]

A known production method can be used as the method of producing a polycarbonate including: introducing the tertiary amine as the polymerization catalyst into the reaction process; and performing the interfacial polycondensation between the alkali aqueous solution of the dihydric phenol and phosgene in the presence of the organic solvent. Specifically, the following method can be given: the alkali aqueous solution of the dihydric phenol and phosgene are caused to react with each other in the presence of the organic solvent to provide a reaction liquid containing a polycarbonate oligomer, and then the reaction liquid containing the polycarbonate oligomer and the dihydric phenol are subjected to polycondensation to provide a reaction liquid containing the polycarbonate. The same reactor can be used in the step of obtaining the reaction liquid containing the polycarbonate oligomer and the step of obtaining the reaction liquid containing the polycarbonate, or the production can be performed by using different reactors in the respective steps. In the method of producing a polycarbonate of the present invention, a reaction is performed by introducing the tertiary amine as the polymerization catalyst into the step of obtaining the reaction liquid containing the polycarbonate oligomer or the step of polymerizing the polycarbonate oligomer to provide the reaction liquid containing the polycarbonate. A method of introducing the tertiary amine is described later.

Among the above-mentioned polycarbonate production methods, the following method is particularly preferably used: the reaction liquid containing the polycarbonate oligomer is continuously obtained, and in another reactor, by adding the alkali aqueous solution of the dihydric phenol to the resultant reaction liquid containing the polycarbonate oligomer, the reaction liquid containing the polycarbonate is continuously obtained.

The respective steps of a preferred production method to be used as the method of producing a polycarbonate of the present invention are individually described below. The preferred production method to be used as the method of producing a polycarbonate of the present invention comprises steps (a) to (d).

<Step (a)>

The step (a) is a step of subjecting the alkali aqueous solution of the dihydric phenol and phosgene to a phosgenation reaction in the presence of the organic solvent to provide a reaction liquid.

In the step (a), the alkali aqueous solution of the dihydric phenol and phosgene intensely react with each other to involve heat generation, and hence the reaction product is desirably cooled to from 0° C. to 50° C. in order that a side reaction may be suppressed. Therefore, a reactor provided with a cooling facility for cooling the reaction product is preferably used as a reactor to be used in the step (a). In addition, when the alkali aqueous solution of the dihydric phenol, phosgene, and the organic solvent are continuously introduced into the reactor, the raw materials are preferably subjected to the phosgenation reaction in such a state that the reaction liquid is brought into a turbulent state in the reactor. A mixing reactor is desirably used as such reactor, and the mixing reactor is preferably a static mixer. The static mixer is preferably a tubular reactor having in itself an element having an action of dividing, converting, or inverting a fluid, and the element generally has a shape obtained by twisting a rectangular plate by 180°. The reaction mixture introduced into the reactor is divided into two portions every time the mixture passes one element. In addition, the reaction mixture fluid or the reaction product fluid are converted from the central portion of the tube to the wall portion thereof and from the wall portion of the tube to the central portion along a spiral surface of the element. Further, the rotation direction of the fluid is changed every one element, and hence the fluid undergoes abrupt reversal of an inertial force to be turbulently stirred.

When the tubular static mixer described above is used as the reactor, in the reactor, air bubbles in the liquid are reduced in size to enlarge a contact interface between the raw materials, and hence reaction efficiency is drastically improved.

The alkali aqueous solution of the dihydric phenol, phosgene, and the organic solvent are introduced into the reactor to be used in the step (a), and are mixed and subjected to the phosgenation reaction. Here, the usage amount of the organic solvent is desirably selected so that a volume ratio between an organic solvent phase and an aqueous phase may be from 5/1 to 1/7, preferably from 2/1 to 1/4. With regard to the usage amount of phosgene, phosgene is preferably used in excess so that its amount may be typically from 1.05 mol to 1.5 mol, preferably from 1.1 mol to 1.3 mol with respect to 1 mol of the dihydric phenol.

In the phosgenation reactor of the step (a), heat is generated by a reaction in which a terminal group of the dihydric phenol is turned into a chloroformate by phosgene, or a reaction in which phosgene is decomposed by the alkali, and hence the temperature of the reaction product increases. Accordingly, the reaction product is preferably cooled so that the temperature may be from 0° C. to 80° C., preferably from 5° C. to 70° C. When the tubular static mixer described above is used as the reactor, an exothermic reaction starts from the merging point of the alkali aqueous solution of the dihydric phenol and phosgene, and hence the cooling is preferably performed also at the merging point. As the reaction product flows in the reactor of the tubular static mixer toward the outlet of the reactor, phosgene is consumed and hence the generation of intense heat of reaction is gradually stopped. A primary object of the reaction in the step (a) is to turn the terminal group of the dihydric phenol into a chloroformate with phosgene, and hence substantially no oligomerization reaction advances.

<Step (b)>

The step (b) is a step of introducing the alkali aqueous solution of the dihydric phenol into the reaction liquid obtained from the step (a) to provide the reaction liquid containing the polycarbonate oligomer. Raw materials to be used in the step (b) and reaction conditions for the step are described.

As described above, substantially no oligomerization reaction advances in the step (a), and hence the polycarbonate oligomer having a weight-average molecular weight of preferably 5,000 or less is produced by performing an oligomerization reaction in the step (b) to increase the molecular weight of the reaction product of the step (a). In the step (b), the oligomerization reaction is performed by adding the alkali aqueous solution of the dihydric phenol and the tertiary amine serving as the polymerization catalyst to be used as required to the reaction liquid obtained from the step (a). The alkali aqueous solution of the dihydric phenol to be used in the step (a) is used as the alkali aqueous solution of the dihydric phenol to be used here. A method to be described later is used as a method of introducing the tertiary amine serving as the polymerization catalyst into the step (b).

A stirring tank is generally used as a reactor to be used in the step (b). The stirring tank is not particularly limited as long as the stirring tank is a tank-type and includes a stirrer.

The reaction liquid obtained from the step (a) is introduced into the reactor for advancing the oligomerization reaction. The residual amounts of an unreacted dihydric phenol and a remaining alkali component in the reaction liquid obtained from the step (a) are small, and hence in order that the oligomerization reaction may be advanced, the reaction needs to be performed by adding the dihydric phenol and the alkali component.

The oligomerization reaction of the step (b) is advanced by a reaction between a compound obtained from the step (a) in which the terminal group of the dihydric phenol has been turned into a chloroformate by phosgene, and the dihydric phenol in the presence of the alkali in the reactor to be used. In the method of producing a polycarbonate of the present invention, the oligomerization reaction can be advanced by, for example, introducing the alkali aqueous solution of the dihydric phenol prepared in advance to be used in the step (a) into the reactor, and introducing the alkali aqueous solution prepared in advance into the reactor in addition to the foregoing solution.

As another method, the oligomerization reaction can be advanced by: recycling an aqueous phase out of an organic solvent phase and the aqueous phase obtained by the separation of the reaction liquid containing the polycarbonate obtained after a polycondensation step [aqueous phase obtained in a step (e) to be described later]; and introducing the recycled aqueous phase into the reactor of the step (b). The aqueous phase obtained in the step (e) contains an unreacted dihydric phenol and an alkali, and the dihydric phenol and the alkali can be effectively utilized by recycling the aqueous phase. The aqueous phase after the polycondensation step may contain sodium carbonate produced by a decomposition reaction occurring at the time of the polycondensation step between a chloroformate group of the polycarbonate oligomer, which has not been used in the polymerization, and sodium hydroxide.

The dihydric phenol to be added in the step (b) is desirably added at a concentration of typically from 0.05 mol/L to 0.15 mol/L, preferably from 0.06 mol/L to 0.12 mol/L, more preferably from 0.06 mol/L to 0.08 mol/L, and the alkali to be added in the step (b) is desirably added at a concentration of typically from 0.03 mol/L to 0.25 mol/L, preferably from 0.05 mol/L to 0.21 mol/L, more preferably from 0.12 mol/L to 0.15 mol/L. The usage amount of the organic solvent in the reaction liquid of the step (b) is typically selected so that a volume ratio between an organic phase and an aqueous phase may be preferably from 5/1 to 1/7, more preferably from 2/1 to 1/4.

The step (b) is a step of obtaining the reaction liquid containing the polycarbonate oligomer, and an upper limit value for the weight-average molecular weight of the polycarbonate oligomer is preferably 5,000, and a lower limit value therefor is typically about 500. In the step (b), a terminal stopper is preferably added for setting the weight-average molecular weight of the polycarbonate oligomer to 5,000 or less. The addition of the terminal stopper facilitates the adjustment of the weight-average molecular weight of the polycarbonate oligomer in the step (b) to 5,000 or less. The terminal stopper is not particularly limited, and a terminal stopper to be used in the production of a polycarbonate can be used. Specific examples of a compound to be used as the terminal stopper may include monohydric phenols, such as phenol, p-cresol, p-tert-butylphenol, p-tert-octylphenol, p-cumylphenol, 3-pentadecylphenol, bromophenol, tribromophenol, and nonylphenol. Among them, at least one selected from p-tert-butylphenol, p-cumylphenol, and phenol is preferred in terms of, for example, economical efficiency and ease of availability. Each of those terminal stoppers may be introduced into the step (b) after having been dissolved in an organic solvent, such as methylene chloride, and having been added to the reaction liquid obtained from the step (a), or may be introduced by direct addition to the reactor to be used in the step (b).

The reaction is performed while a temperature in the reactor in the step (b) is maintained at a temperature within the range of typically from 5° C. to 50° C., preferably from 5° C. to 40° C. With regard to a stirring condition, the reaction liquid is stirred under such a relatively moderate condition that the liquid becomes a laminar flow. The retention time of the reaction liquid in the reactor is generally from 15 minutes to 60 minutes, though the time varies depending on, for example, the target molecular weight of the polycarbonate oligomer and the properties of the reaction liquid obtained from the step (a).

<Step (c)>

The step (c) is a step of separating the reaction liquid containing the polycarbonate oligomer obtained from the step (b) into the aqueous phase and the organic solvent phase containing the polycarbonate oligomer. A settling tank is preferably used as an apparatus to be used in the step (c). The reaction liquid obtained in the step (b) is introduced into the settling tank, and is separated into the aqueous phase and the organic solvent phase containing the polycarbonate oligomer by their specific gravity difference. The organic solvent phase containing the polycarbonate oligomer as a lower layer is continuously or intermittently extracted from the lower side of the settling tank. The aqueous phase as an upper layer is continuously or intermittently extracted, and the level of each phase in the settling tank is maintained so as to fall within a certain level range.

<Step (d)>

The step (d) is a step of causing the organic solvent phase containing the polycarbonate oligomer separated in the step (c) and the alkali aqueous solution of the dihydric phenol to react with each other (interfacial polycondensation) to provide the reaction liquid containing the polycarbonate. In addition, in the step (d), the organic solvent phase containing the polycarbonate oligomer separated in the step (c), the alkali aqueous solution of the dihydric phenol, and a polyorganosiloxane can be caused to react with each other (interfacial polycondensation) to provide a reaction liquid containing a polycarbonate-polyorganosiloxane copolymer.

In the step (d), the molecular weight of the polycarbonate to be obtained is adjusted within a target molecular weight range by subjecting the respective components to the interfacial polycondensation reaction in the presence of a terminal stopper to be used as required. The polycondensation reaction is performed until the molecular weight of the polycarbonate to be obtained typically falls within the range of from about 10,000 to about 50,000 in terms of a viscosity-average molecular weight. In the step (d), the tertiary amine is used as the polymerization catalyst for accelerating the polycondensation reaction.

In the step (d), the usage amount of the organic solvent in the interfacial polycondensation is typically selected so that a volume ratio between an organic phase and an aqueous phase may be preferably from 7/1 to 1/1, more preferably from 5/1 to 2/1.

With regard to a reactor to be used in the step (d), the reaction can be completed with only one reactor depending on the ability of the reactor. A plurality of reactors, such as a second reactor and a third reactor subsequent to the first reactor, can also be further constructed and used as required. A stirring tank, a tower-type stirring tank with a vertical multistage impeller, a stationary tank, a static mixer, a line mixer, an orifice mixer, a pipe, and the like can be used as those reactors. Those reactors may be arbitrarily combined to be used. A method to be described later is used as a method of introducing the tertiary amine serving as the polymerization catalyst into the step (d).

The reaction in the step (d) is performed at a temperature in the range of typically from 0° C. to 50° C., preferably from 20° C. to 40° C. In the step (d), the interfacial polycondensation may be performed by adding the organic solvent and the alkali aqueous solution described above as required.

In particular, in the case where the reaction liquid containing the polycarbonate-polyorganosiloxane copolymer is produced by using the polyorganosiloxane in the step (d), the amount of an unreacted polyorganosiloxane can be reduced by using a larger amount of the tertiary amine than that of a tertiary amine to be used at the time of the production of a normal homopolycarbonate, such as a bisphenol A polycarbonate. In this case, the tertiary amine is preferably introduced into the step (d) at a mass ratio of from 0.001 to 0.1 with respect to the polyorganosiloxane. An increase in amount of the unreacted polyorganosiloxane in the step (d) is not preferred because of the following reason: the unreacted polyorganosiloxane is incorporated into a granulated product, powder, pellet, or the like of the polycarbonate-polyorganosiloxane copolymer to be finally obtained, and hence when the copolymer is turned into a molded article, the unreacted polyorganosiloxane adversely affects its transparency or the like.

At least one of polyorganosiloxane selected from the following general formulae (2), (3), and (4) may be suitably used as the polyorganosiloxane:

(2)

(3)

(4)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ and/or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, Z represents a hydrogen atom or a halogen atom, and a plurality of Z may be identical to or different from each other, β represents a divalent group derived from a diisocyanate compound, or a divalent group derived from a dicarboxylic acid or a halide of a dicarboxylic acid, p and q each represent an integer of 1 or more, and a sum of p and q is from 20 to 500, and n represents an average number of repetitions of from 20 to 500.

Examples of the halogen atom that $R^3$ to $R^6$ each independently represent include a fluorine atom, a chlorine atom, a bromine atom, and an iodine atom. Examples of the alkyl group that $R^3$ to $R^6$ each independently represent include a methyl group, an ethyl group, a n-propyl group, an isopropyl group, various butyl groups (the term "various" means that a linear group and all kinds of branched groups are included, and the same applies hereinafter), various pentyl groups, and various hexyl groups. The alkoxy group that $R^3$ to $R^6$ each independently represent is, for example, a group whose alkyl group moiety is the above-mentioned alkyl group. Examples of the aryl group that $R^3$ to $R^6$ each independently represent include a phenyl group and a naphthyl group.

$R^3$ to $R^6$ each preferably represent a hydrogen atom, an alkyl group having 1 to 6 carbon atoms, an alkoxy group having 1 to 6 carbon atoms, or an aryl group having 6 to 12 carbon atoms.

The polyorganosiloxanes represented by the general formulae (2), (3), and (4) are each preferably a polyorganosiloxane in which $R^3$ to $R^6$ each represent a methyl group.

The linear or branched alkylene group represented by $R^7$ in —$R^7$—, —$R^7$COO—, —$R^7$NH—, —$R^7$NR$^8$—, —COO—, —S—, —$R^7$COO—$R^9$—O—, or —$R^7$O—$R^{10}$—O— represented by Y is, for example, an alkylene group having 1 to 8 carbon atoms, preferably 1 to 5 carbon atoms, and the cyclic alkylene group represented by $R^7$ is, for example, a cycloalkylene group having 5 to 15 carbon atoms, preferably 5 to 10 carbon atoms.

The aryl-substituted alkylene group represented by $R^7$ may have a substituent, such as an alkoxy group or an alkyl group, on its aromatic ring, and a specific structure thereof may be, for example, a structure represented by the following general formula (5) or (6), provided that when the polyorganosiloxane has an aryl-substituted alkylene group, the alkylene group moiety of the group is bonded to Si:

(5)

(6)

wherein c represents a positive integer and typically represents an integer of from 1 to 6.

The diarylene group represented by any one of $R^7$, $R^9$, and $R^{10}$ refers to a group in which two arylene groups are linked to each other directly or through a divalent organic group, and specifically refers to a group having a structure represented by —Ar$^1$—W—Ar$^2$—. Here, Ar$^1$ and Ar$^2$ each represent an arylene group, and W represents a single bond or a divalent organic group. Examples of the divalent organic group represented by W include an isopropylidene group, a methylene group, a dimethylene group, and a trimethylene group.

Examples of the arylene group represented by any one of $R^7$, Ar$^1$, and Ar$^2$ include arylene groups each having 6 to 14 ring-forming carbon atoms, such as a phenylene group, a naphthylene group, a biphenylene group, and an anthrylene group. Those arylene groups may each have an arbitrary substituent, such as an alkoxy group or an alkyl group.

The alkyl group represented by $R^8$ is a linear or branched alkyl group having 1 to 8, preferably 1 to 5 carbon atoms. The alkenyl group represented by $R^8$ is, for example, a linear or branched alkenyl group having 2 to 8, preferably 2 to 5 carbon atoms. Examples of the aryl group represented by $R^8$ include a phenyl group and a naphthyl group. Examples of the aralkyl group represented by $R^8$ include a phenylmethyl group and a phenylethyl group.

Examples of the linear, branched, or cyclic alkylene group represented by $R^{10}$ include the same examples as those of $R^7$.

Y preferably represents —$R^7O$—, and $R^7$ represents an aryl-substituted alkylene group, in particular a residue of a phenol-based compound having an alkyl group, and more preferably represents an organic residue derived from allylphenol or an organic residue derived from eugenol.

With regard to p and q in the general formula (3), it is preferred that p=q, i.e., p=n/2 and q=n/2.

The average number n of repetitions represents from 20 to 500, more preferably from 50 to 400, still more preferably from 70 to 300. When n represents 20 or more, an excellent impact resistance can be obtained, and significant restoration of the impact resistance can be achieved. When n represents 500 or less, handleability at the time of the production of the PC-POS becomes excellent. The number n of repeating units can be calculated by $^1$H-NMR.

β represents a divalent group derived from a diisocyanate compound, or a divalent group derived from a dicarboxylic acid or a halide of a dicarboxylic acid, and examples thereof include divalent groups represented by the following general formulae (7-1) to (7-5).

(7-1)

(7-2)

(7-3)

(7-4)

(7-5)

Examples of the polyorganosiloxane represented by the general formula (2) include compounds represented by the following general formulae (2-1) to (2-11):

(2-1)

(2-2)

(2-3)

(2-4)

(2-5)

(2-6)

(2-7)

(2-8)

(2-9)

(2-10)

(2-11)

In the general formulae (2-1) to (2-11), $R^3$ to $R^6$, n, and $R^8$ are as defined above, and preferred examples thereof are also the same, and c represents a positive integer and typically represents an integer of from 1 to 6.

Among them, a phenol-modified polyorganosiloxane represented by the general formula (2-1) is preferred from the viewpoint of the ease of polymerization. In addition, an α,ω-bis [3-(o-hydroxyphenyl)propyl]polydimethylsiloxane serving as one in the compounds each represented by the general formula (2-2), or an α,ω-bis [3-(4-hydroxy-3-methoxyphenyl)propyl]polydimethylsiloxane serving as one in the compounds each represented by the general formula (2-3) is preferred from the viewpoint of the ease of availability.

As described above, it is necessary that in the method of producing a polycarbonate of the present invention, the following requirements (i) to (iii) be satisfied in the introduction of the tertiary amine as the polymerization catalyst into the reaction process:

(i) a portion into which the tertiary amine is introduced comprises at least a tertiary amine storage tank, a tertiary amine supply pipe, and a diluent solvent supply pipe from which a diluent solvent for the tertiary amine is supplied;

(ii) the portion further comprises a pressure control valve in the tertiary amine supply pipe on an upstream side of a merging portion with the diluent solvent supply pipe; and (iii) when a pressure of an inside of the tertiary amine storage tank pressurized by a pressurization gas is represented by $P_1$ and a pressure in a portion ranging from an outlet of the storage tank to an upstream side of the pressure control valve is represented by $P_2$, a relationship of $P_1 \leq P_2$ is satisfied.

The phrase "(i) a portion into which the polymerization catalyst is introduced comprises at least a tertiary amine storage tank, a tertiary amine supply pipe, and a diluent solvent supply pipe from which a diluent solvent for the tertiary amine is supplied" requires that the tertiary amine serving as the polymerization catalyst be introduced from the tertiary amine storage tank through the tertiary amine supply pipe after having been diluted with a diluent solvent from the diluent solvent supply pipe.

The phrase "(ii) the portion further comprises a pressure control valve in the tertiary amine supply pipe on the upstream side of a merging portion with the diluent solvent supply pipe" requires that the pressure control valve be installed in the tertiary amine supply pipe on the way to the position at which the tertiary amine supply pipe connected to the tertiary amine storage tank merges with the diluent solvent supply pipe. The tertiary amine supply pipe is sometimes installed at a position higher than the tertiary amine storage tank depending on, for example, the design of an apparatus. Accordingly, the pressure control valve is preferably installed near the position at which the tertiary amine supply pipe and the diluent solvent supply pipe merge with each other.

The phrase "(iii) when the pressure of the inside of the tertiary amine storage tank pressurized by a pressurization gas is represented by $P_1$ and a pressure in a portion ranging from the outlet of the storage tank to the upstream side of the pressure control valve is represented by $P_2$, a relationship of $P_1 \leq P_2$ is satisfied" requires that when the inner pressure of the inside of the tertiary amine storage tank pressurized by the pressurization gas is represented by $P_1$ and the pressure in the portion ranging from the outlet of the storage tank to the pressure control valve is represented by $P_2$, the relationship of $P_1 \leq P_2$ be satisfied. Even when there is a difference in height between the positions of the storage tank and the tertiary amine supply pipe, the inside of the storage tank is pressurized in order that the tertiary amine may be easily delivered from the inside of the tank. Here, the pressure $P_2$ in the portion ranging from the outlet of the storage tank to the pressure control valve means the minimum pressure of the pressure in the portion ranging from the outlet of the storage tank to the pressure control valve. When the relationship of $P_1 \leq P_2$ is satisfied by installing the pressure control valve, the pressure $P_2$ in the tertiary amine supply pipe in the portion ranging from the outlet of the storage tank to the pressure control valve does not fall below the inner pressure $P_1$ of the inside of the tertiary amine storage tank. Accordingly, even when the tertiary amine supply pipe is installed at a position higher than the tertiary amine storage tank, the pressurization gas dissolved in the tertiary amine does not appear as bubbles. Accordingly, a gas accumulation due to the pressurization gas does not occur in the tertiary amine supply pipe, and hence the tertiary amine can be supplied without any fluctuation in flow rate thereof. When such pressure control is performed, the standard deviation of the amount of the tertiary amine supplied from the tertiary amine supply pipe with respect to the average flow rate thereof can be set to within 5%.

Figure 1:
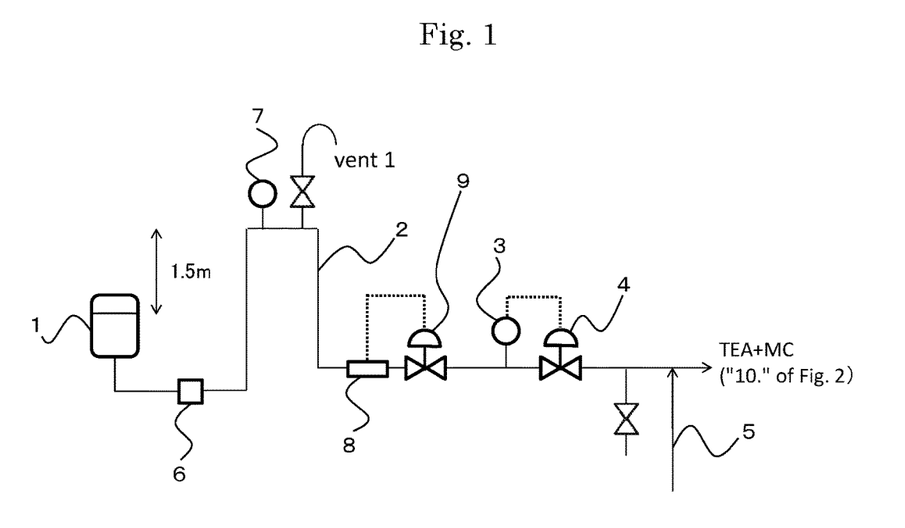
FIG. 1 is a schematic view of a process up to the introduction of a tertiary amine serving as a polymerization catalyst into a reaction process, the former process being performed in each of Examples in a method of producing a polycarbonate of the present invention.

FIG. 1 is an illustration of a flowchart up to the introduction of a tertiary amine serving as a polymerization catalyst into a reaction process in the method of producing a polycarbonate of the present invention. In FIG. 1, a tertiary amine (TEA) is transferred from the bottom portion of a tertiary amine storage tank (1) through a tertiary amine supply pipe (2) to be mixed with a diluent solvent, and hence the tertiary amine is introduced as a diluted tertiary amine solution into the reaction process. A pressure control valve (4) having a pressure gauge (3) is installed in the tertiary amine supply pipe on the upstream side of a merging portion with a diluent solvent supply pipe (5). A flow rate control valve (9) is arranged between the outlet of the tertiary amine storage tank and the pressure control valve for controlling the flow rate of the tertiary amine, and a liquid delivery pump (6) for delivering the tertiary amine is preferably installed between the outlet of the tertiary amine storage tank and the flow rate control valve, and near the outlet of the storage tank.

Nitrogen, air, or the like can be used as a pressurization gas for pressurizing the inside of the tertiary amine storage tank. Nitrogen serving as an inert gas is preferably used because the tertiary amine, such as triethylamine, is often a combustible material.

It has been described that the method of producing a polycarbonate of the present invention preferably comprises the steps (a) to (d). The method may further comprise the following step (e), and at least part of an aqueous phase containing an unreacted dihydric phenol from the step (e) is more preferably used as the alkali aqueous solution of the dihydric phenol to be added to the step (b). The step (e) is described below.

<Step (e)>

The step (e) is a step of separating the reaction liquid (emulsion solution) containing the polycarbonate obtained in the step (d) into an organic solvent phase containing the polycarbonate and the aqueous phase containing the unreacted dihydric phenol. The unreacted dihydric phenol can be reused as a raw material in the step (b). The separability of the emulsion solution is preferably as satisfactory as possible because a moisture content in the organic solvent phase after the separation is desirably reduced to the extent possible. The separability can be evaluated by, for example, measuring a moisture concentration in the organic solvent phase obtained in the step (e), and the concentration can be measured by, for example, introducing a gas produced by heating the organic solvent phase to 120° C. into a Karl Fischer moisture meter.

An upper limit value for the moisture concentration in the organic solvent phase varies depending on the ability of a subsequent washing step. It is effective to remove an aqueous phase containing impurities from an organic phase to the extent possible in the oil-water separation of the emulsion solution obtained in the step (d) from the viewpoint of production efficiency. Specifically, the upper limit value is preferably 4,000 ppm by mass or less, more preferably 3,500 ppm by mass or less.

Figure 4:
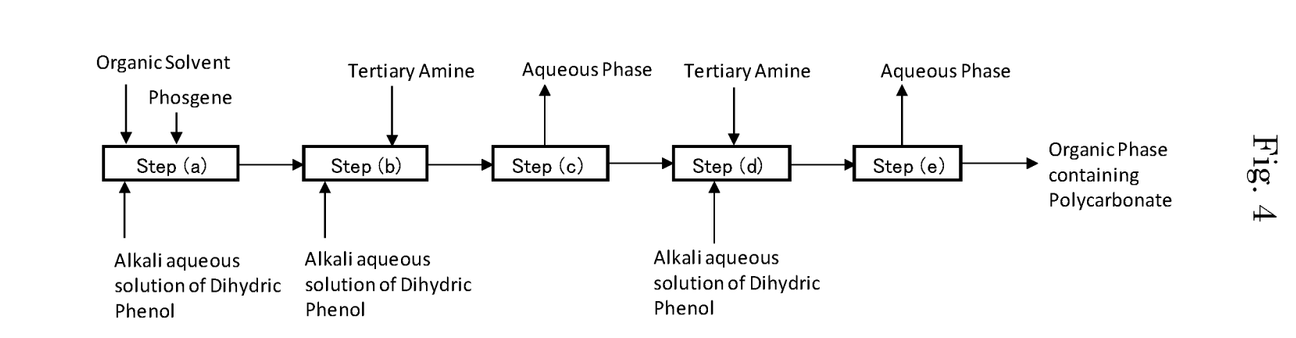
FIG. 4 is a schematic view of a process from a step (a) to a step (e) in a production process for a polycarbonate of the present invention.

An apparatus to be used for the separation into the organic solvent phase containing the polycarbonate and the aqueous phase containing the unreacted dihydric phenol in the step (e) may be, for example, a settling tank or a centrifugal separator. FIG. 4 is a flow chart of the step (a) to the step (e).

The organic solvent phase containing the polycarbonate separated in the step (e) may be sequentially subjected to alkali washing, acid washing, and pure water washing to provide an organic solvent phase containing a purified polycarbonate. The organic solvent phase containing the purified polycarbonate is concentrated as required to provide an organic solvent solution containing the polycarbonate, and then the solution is subjected to a kneader treatment, hot water granulation, or the like. Thus, polycarbonate powder can be obtained. The organic solvent remains in the resultant polycarbonate powder, and hence polycarbonate powder from which the organic solvent has been removed can be obtained by performing a drying treatment, such as a heating treatment. Various molded bodies can be obtained by pelletizing the resultant polycarbonate powder with a pelletizer or the like.

EXAMPLES

The present invention is hereinafter described more specifically by way of Examples. The present invention is not limited by these examples. Measurements and evaluations in Examples and Comparative Examples were performed by the following methods.

<Measurement of Weight-Average Molecular Weight (Mw)>

A weight-average molecular weight (Mw) was measured as a molecular weight in terms of standard polystyrene (weight-average molecular weight: Mw) by GPC [column: TOSOH TSK-GEL MULTIPORE HXL-M (2 columns)+ Shodex KF801 (1 column), temperature: 40° C., flow rate: 1.0 ml/min, detector: RI] using tetrahydrofuran (THF) as a developing solvent.

<Measurement of Chloroformate Group Concentration (CF Value)>

Measurement was performed on the basis of a chlorine ion concentration with reference to JIS K 8203 by using redox titration and silver nitrate titration.

<Measurement of Content (Mass %) of Polydimethylsiloxane in Polycarbonate-Polydimethylsiloxane Copolymer>

Measurement was performed by NMR measurement in terms of a proton of a methyl group in polydimethylsiloxane (PDMS).

<Measurement of Content (Ppm by Mass) of Unreacted Polydimethylsiloxane in Polycarbonate-Polydimethylsiloxane Copolymer>

(i) 50 ml of acetone and 150 ml of n-hexane were added to a solution obtained by dissolving 6 g of the resultant polycarbonate-polydimethylsiloxane copolymer flake in 50 ml of methylene chloride, and the contents were mixed. After that, the mixture was left at rest for 30 minutes.

(ii) After suction filtration of mixture through the use of filter paper (Advantec, No. 5A), a filtrate was obtained and the filtrate was concentrated to dryness, followed by the measurement of the weight of the resultant dry product. The resultant dry product was dissolved in deuterated chloroform, and the $^1$H-NMR measurement of the solution was performed. A ratio z (%) of an unreacted PDMS was calculated from the following equation by using an integrated value x of a proton of hydroxyl group at an ortho position ($\delta$=6.7 ppm) of an unreacted phenol-modified polydimethylsiloxane and an integrated value y of a proton ($\delta$=0.6 ppm) assigned to a methylene chain.

$$z = 2 \times x \div y \times 100$$

(iii) Meanwhile, a standard sample obtained by adding 150 ppm to 2,000 ppm of a phenol-modified polydimethylsiloxane to a polycarbonate-polydimethylsiloxane copolymer substantially free of any unreacted PDMS prepared as a standard sample was separately prepared, and a relational expression (calibration curve) between the z and the amount of the unreacted PDMS (ppm by mass=addition amount of the phenol-modified polydimethylsiloxane) was determined by performing the same operation as that described above.

The amount of the unreacted PDMS (ppm by mass) was calculated from the z determined in the (ii) and the relational expression determined in the (iii).

<Measurement of Viscosity Number (VN)>

A Viscosity Number (VN) was Measured in Conformity with ISO 1628-4 (1999).

<Measurement of Viscosity-Average Molecular Weight (Mv)>

A viscosity-average molecular weight (Mv) is calculated from the following expression by using a limiting viscosity [η] determined by measuring the viscosity of a methylene chloride solution at 20° C. with an Ubbelohde-type viscometer.

$$[\eta]=1.23\times10^{-5}Mv^{0.83}$$

<Measurement of Moisture Content in Organic Solvent Phase>

An organic solvent phase was heated to 120° C., and measurement was performed by introducing a produced gas into a Karl Fischer moisture meter (manufactured by Mitsubishi Chemical Analytech Co., Ltd., Model CA-200).

Example 1

A reaction liquid was obtained by performing a phosgenation reaction through the use of a solution of bisphenol A in aqueous sodium hydroxide (bisphenol A concentration: 13.5 mass %) in the presence of methylene chloride. To this reaction liquid, the solution of bisphenol A in aqueous sodium hydroxide and a 1 mass % aqueous solution of triethylamine (aqueous solution of TEA) were further added to obtain a reaction liquid containing a polycarbonate oligomer [the aqueous solution of TEA was added by a method to be described later]. The reaction liquid containing the polycarbonate oligomer was subjected to settled separation to provide an organic solvent phase containing the polycarbonate oligomer. The organic solvent phase was used in a reaction to be described later. The polycarbonate oligomer in the organic solvent phase had a weight-average molecular weight of 3,100.

Figure 2:
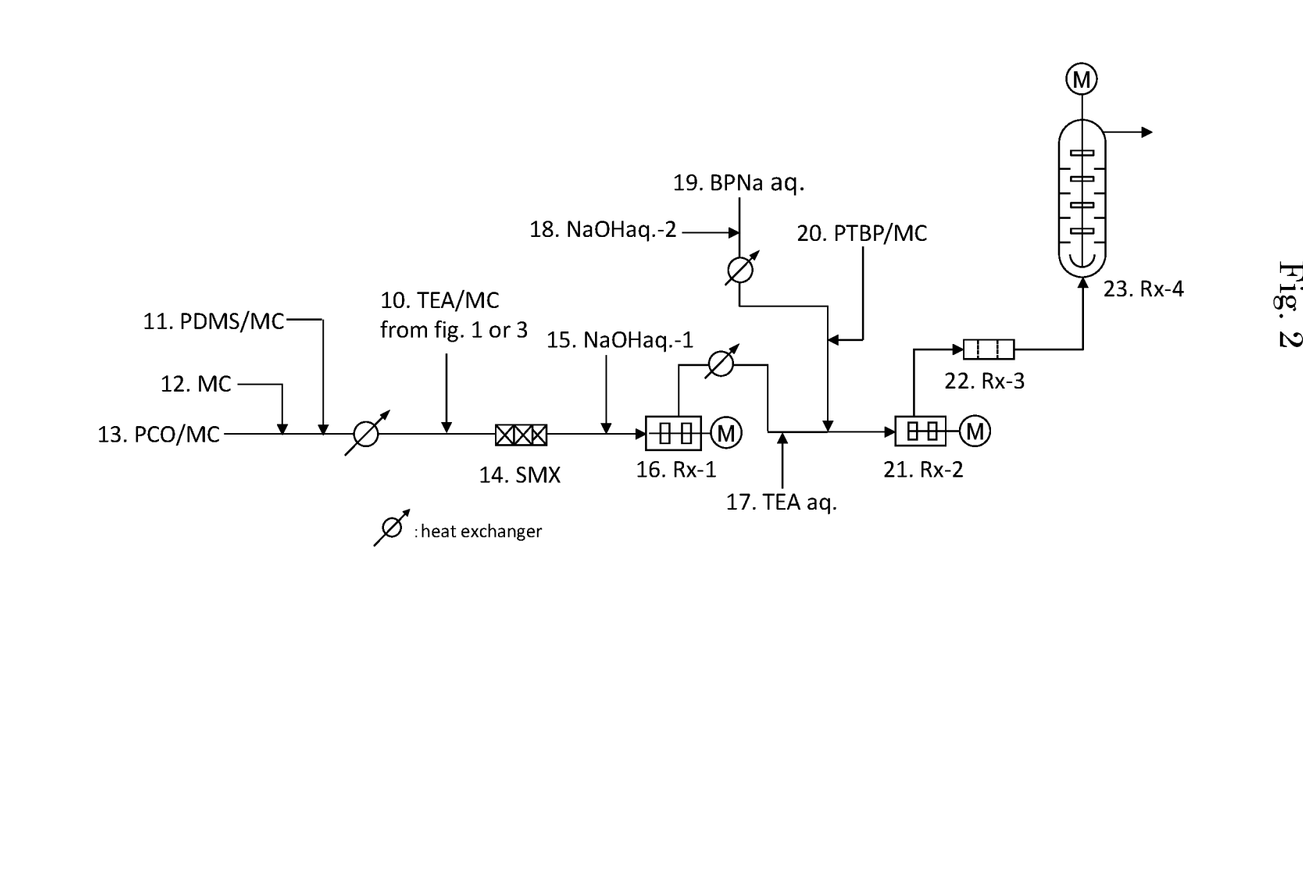
FIG. 2 is a schematic view of a step (d) used in each of Examples in the method of producing a polycarbonate of the present invention.

In a flowchart illustrated in FIG. 2, 2,600 Kg/hr of the organic solvent phase containing the polycarbonate oligomer (sometimes referred to as "PCO/MC") and 1,250 Kg/hr of methylene chloride (MC) were mixed (concentration of the polycarbonate oligomer: 221 g/L) in a pipe. Then, 260 Kg/hr of a 20 mass % methylene chloride solution of an allylphenol terminal-modified polydimethylsiloxane having a number (n) of repetitions of a dimethylsiloxane unit of 90 was added to the mixture, and the contents were mixed in the pipe. After that, the contents were mixed well with a static mixer, and then the liquid mixture was cooled to from 19° C. to 22° C. with a heat exchanger.

80.0 Kg/hr of a liquid mixture of triethylamine and methylene chloride, the liquid mixture containing 1 mass % of triethylamine, was introduced as a polymerization catalyst into the above cooled liquid mixture. The liquid mixture of triethylamine and methylene chloride was introduced by a method to be described later. After that, the contents were mixed well with a static mixer (14). Then, 140 Kg/hr of 8.0 mass % aqueous sodium hydroxide (NaOH aq.-1) was added to the mixture just before a reactor (Rx-1) (16), and in the reactor (Rx-1) (16), a reaction (preliminary polymerization) between the polycarbonate oligomer and the allylphenol terminal-modified PDMS was performed while a methylene chloride phase was used as a continuous phase. The reactor (Rx-1) (16) is a mixer provided with a turbine blade "PIPE-LINE HOMO MIXER" [manufactured by Tokushu Kika Kogyo Co., Ltd.], and was operated at a number of revolutions of 4,400 rpm.

Next, the preliminary polymerization liquid that had exited the reactor (Rx-1) (16) was cooled to from 17° C. to 20° C. with a heat exchanger. After that, first, 17.0 Kg/hr of a 1 mass % aqueous solution of triethylamine (aqueous solution of TEA) was added to the cooled liquid just before a reactor (Rx-2) (21) [the aqueous solution of TEA was added by a method to be described later]. Next, the following mixture: 1,020 Kg/hr of the solution of BPA in aqueous sodium hydroxide [used at the time of the production of the polycarbonate oligomer] and 150 Kg/hr of 15 mass % aqueous sodium hydroxide (NaOH aq.-2) were merged with each other and were mixed well with a static mixer, after that, 130 Kg/hr of an 8 mass % methylene chloride solution of p-t-butylphenol (PTBP) was further added to the mixture, and the contents were mixed in a pipe; was added to the liquid, and a polymerization reaction (main polymerization) was performed in the reactor (Rx-2) (21). An aqueous phase ratio at the inlet of the reactor (Rx-2) (21) was 27.6 vol %. The reactor (Rx-2) (21) is a mixer provided with a turbine blade "PIPELINE HOMO MIXER" [manufactured by Tokushu Kika Kogyo Co., Ltd.], and was operated at a number of revolutions of 4,400 rpm.

The polymerization reaction liquid that had exited the reactor (Rx-2) (21) was sequentially introduced into a reactor (Rx-3) (22) and a reactor (Rx-4) (23), and the polymerization reaction was completed while its temperature was controlled to 38° C. or less. The reactor (Rx-3) (22) is a reactor having an orifice plate and a cooling jacket, and the reactor (Rx-4) (23) is a tower-type stirring tank with a vertical five-stage impeller having a cooling jacket.

0.29 L of methylene chloride for dilution was added to 1 L of the polymerization reaction liquid that had exited the reactor (Rx-4) (23), and the mixture was stirred. After that, the mixture was subjected to settled separation for 1 hour to be separated into an organic solvent phase containing a polycarbonate-polydimethylsiloxane copolymer, and an aqueous phase containing excessive amounts of bisphenol A and sodium hydroxide, followed by the isolation of the organic solvent phase. The methylene chloride solution of the polycarbonate-polydimethylsiloxane copolymer (organic solvent phase) thus obtained was sequentially washed with 0.03 mol/L aqueous sodium hydroxide and 0.2 mol/L hydrochloric acid in amounts of 15 vol % each with respect to the solution. Next, the solution was repeatedly washed with pure water so that an electric conductivity in an aqueous phase after the washing became 0.1 mS/m or less. The methylene chloride solution of the polycarbonate-polydimethylsiloxane copolymer thus obtained was concentrated, and then the concentrate was pulverized and was dried under reduced pressure at 120° C. The respective physical properties of the polycarbonate-polydimethylsiloxane copolymer obtained as described above are shown in Table 1.

Triethylamine (TEA) introduced into the reaction process was introduced by a method described below.

In the flow chart illustrated in FIG. 1, 0.80 kg/hr (average flow rate) of TEA was supplied from the TEA storage tank (1) through the TEA supply pipe (2). The inside of the TEA storage tank (1) was pressurized with nitrogen so as to have a pressure of 0.3 MPaG ($P_1$). The TEA supply pump (6) (PULSELESS PUMP MODEL C21 manufactured by Nikkiso Co., Ltd.), a flowmeter (8) (CORIOLIS FLOWMETER MODEL CN003 manufactured by OVAL Corporation), the flow rate control valve (9), and the pressure control valve (4)

having the pressure gauge (3) were installed in the stated order in the TEA supply pipe (2) before its merging with the diluent solvent (methylene chloride) supply pipe (5), and methylene chloride (MC) supplied from the methylene chloride supply pipe (5) was merged with triethylamine to be introduced into a position represented by reference numeral 10 in FIG. 2. The TEA supply pipe (2) passed a place higher than the liquid level of the TEA storage tank (1) by 1.5 m, and hence a pressure gauge (7) was installed at the place. The pressure of TEA from the TEA storage tank (1) was increased with the pump, and a pressure indicated by the pressure gauge (3) on a downstream side was adjusted to 0.55 MPaG. At this time, a pressure indicated by the pressure gauge (7) was 0.60 MPaG ($P_2$).

In addition, a value indicated by the flowmeter was read at intervals of 1 minute 60 times. As a result, a standard deviation was 0.009 kg/hr, and when the standard deviation was expressed in the unit of % with respect to the average flow rate, the standard deviation was 1.13%. Thus, TEA was mixed with MC in the line, and the mixture was supplied at 80 kg/hr to the reaction process. 0.29 L of methylene chloride for dilution was added to 1 L of the polymerization reaction liquid that had exited the reactor (Rx-4), and the mixture was stirred. After that, the mixture was subjected to settled separation for 1 hour and then the resultant organic solvent phase was collected, followed by the measurement of its moisture content. As a result, the moisture content was 2,800 wtppm. After 6 hours of operation, a vent 1 was opened but the production of a gas could not be confirmed. Conditions for the supply of TEA at this time are shown in Table 1. When the aqueous solution of TEA was introduced into the reaction process (process up to a time point immediately before the introduction of the aqueous solution of TEA represented by reference numeral 17 in FIG. 2), the introduction into the reaction process was performed by the same method except that water was used as a diluent solvent in the pipe 5 in FIG. 1.

Example 2

Polycarbonate production was performed in the same manner as in Example 1 except that in Example 1, an allylphenol terminal-modified polydimethylsiloxane having a number (n) of repetitions of a dimethylsiloxane unit of 40 was used instead of the allylphenol terminal-modified polydimethylsiloxane having a number (n) of repetitions of the dimethylsiloxane unit of 90. The results are shown in Table 1.

Example 3

Polycarbonate production was performed in the same manner as in Example 1 except that in Example 1, the polydimethylsiloxane was not used. The results are shown in Table 1.

Comparative Example 1

Figure 3:
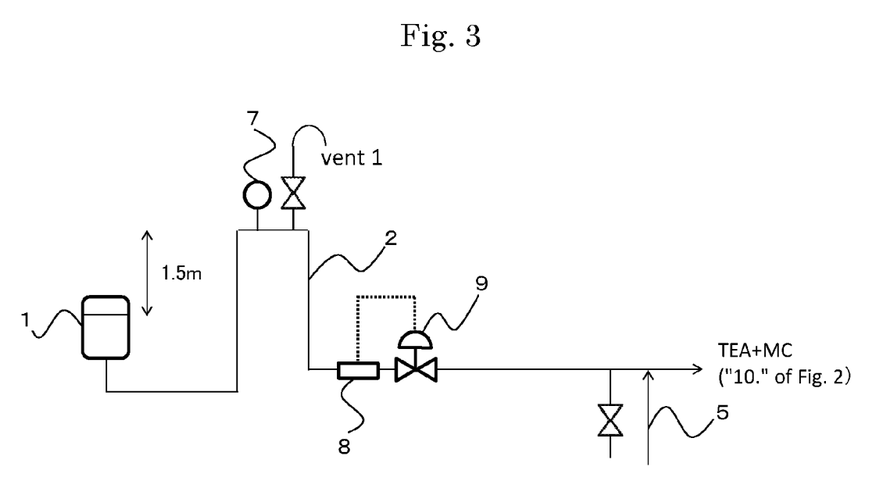
FIG. 3 is a schematic view of a process up to the introduction of a tertiary amine serving as a polymerization catalyst into a reaction process in a method of each of Comparative Examples of the present invention.

Polycarbonate production was performed in the same manner as in Example 1 except that the supply of a solution obtained by diluting TEA with MC was performed in conformity with a flow illustrated in FIG. 3 (the supply of a solution obtained by diluting TEA with water was performed in conformity with the same flow except that water was used as the diluent solvent in the pipe 5 in FIG. 3). In the flow chart illustrated in FIG. 3, 0.80 kg/hr (average flow rate) of TEA was supplied from the TEA storage tank (1) through the TEA supply pipe (2). In addition, in the flow chart illustrated in FIG. 3, TEA was supplied after the inside of the TEA storage tank (1) had been pressurized with nitrogen so as to have a pressure of 0.3 MPaG. The pressure gauge (7), the flowmeter (8), and the flow rate control valve (9) were installed in the TEA supply pipe (2) before its merging with the diluent solvent (methylene chloride (MC)) supply pipe (5), and a diluted triethylamine was introduced into the position represented by reference numeral 10 in FIG. 2. At this time, a pressure indicated by the pressure gauge (7) was 0.25 MPaG. In addition, a value indicated by the flowmeter was read at intervals of 1 minute 60 times. As a result, a standard deviation was 0.082 kg/hr, and when the standard deviation was expressed in the unit of % with respect to the average flow rate, the standard deviation was 10.25%. The results are shown in Table 1. 0.29 L of methylene chloride for dilution was added to 1 L of the polymerization reaction liquid that had exited the reactor (Rx-4), and the mixture was stirred. After that, the mixture was subjected to settled separation for 1 hour and then the resultant organic solvent phase was collected, followed by the measurement of its moisture content. As a result, the moisture content was 4,500 wtppm. In addition, after 6 hours of operation, the vent 1 was opened. As a result, the production of a gas was confirmed.

Comparative Example 2

Polycarbonate production was performed in the same manner as in Comparative Example 1 except that in Comparative Example 1, an allylphenol terminal-modified polydimethylsiloxane having a number (n) of repetitions of a dimethylsiloxane unit of 40 was used instead of the allylphenol terminal-modified polydimethylsiloxane having a number (n) of repetitions of the dimethylsiloxane unit of 90. The results are shown in Table 1.

Comparative Example 3

Polycarbonate production was performed in the same manner as in Comparative Example 1 except that in Comparative Example 1, the polydimethylsiloxane was not used. The results are shown in Table 1.

TABLE 1

| | | Unit | Example 1 | Example 2 | Example 3 | Comparative Example 1 | Comparative Example 2 | Comparative Example 3 |
|---|---|---|---|---|---|---|---|---|
| Supply of TEA | Supply system flow | | FIG. 1 | FIG. 1 | FIG. 1 | FIG. 3 | FIG. 3 | FIG. 3 |
| | Pressure in tank (1) | MPaG | 0.30 | 0.30 | 0.30 | 0.30 | 0.30 | 0.30 |
| | Pressure indicated by pressure gauge (7) | MPaG | 0.60 | 0.60 | 0.60 | 0.25 | 0.25 | 0.25 |
| | Pressure indicated by pressure gauge (3) | MPaG | 0.55 | 0.55 | 0.55 | — | — | — |
| | TEA flow rate (average flow rate) | kg/hr | 0.80 | 0.80 | 0.80 | 0.80 | 0.80 | 0.80 |

TABLE 1-continued

|  |  | Unit | Example 1 | Example 2 | Example 3 | Comparative Example 1 | Comparative Example 2 | Comparative Example 3 |
|---|---|---|---|---|---|---|---|---|
|  | Standard deviation of flow rate | kg/hr | 0.009 | 0.026 | 0.013 | 0.082 | 0.119 | 0.102 |
|  | Standard deviation with respect to average flow rate | % | 1.13 | 3.25 | 1.63 | 10.25 | 14.88 | 12.75 |
|  | Situation at the time of opening of vent 1 (after 6 hours) |  | Gas was absent | Gas was absent | Gas was absent | Gas was present | Gas was present | Gas was present |
|  | PDMS chain length | n | 90 | 40 | — | 90 | 40 | — |
| Separation | Moisture content in organic phase after separation | wtppm | 2,800 | 3,300 | 2,900 | 4,500 | 4,900 | 5,000 |
| Physical properties | Amount of PDMS | wt % | 6.1 | 6.0 | — | 6.1 | 6.3 | — |
|  | Unreacted PDMS | wtppm | 150> | 150> | — | 320 | 550 | — |
|  | Viscosity number |  | 47.1 | 47.2 | 46.5 | 47.4 | 47.7 | 46.9 |
|  | Mv |  | 17,500 | 17,600 | 17,240 | 17,700 | 17,800 | 17,400 |

Reference Example 1 and Reference Example 2

In Reference Example 1, in FIG. 1, the TEA storage tank was filled with water instead of TEA, and then 0.80 kg/hr of water was flowed in the same manner as in Example 1, followed by the measurement of the standard deviation of a flow rate and the confirmation of the situation of the production of a gas at the time of the opening of the vent 1. In addition, in Reference Example 2, in FIG. 3, the TEA storage tank was filled with water instead of TEA, and then 0.80 kg/hr of water was flowed in the same manner as in Comparative Example 1, followed by the measurement of the standard deviation of a flow rate and the confirmation of the situation of the production of a gas at the time of the opening of the vent 1. The results are shown in Table 2.

TABLE

|  | Unit | Example 1 | Reference Example 1 | Comparative Example 1 | Reference Example 2 |
|---|---|---|---|---|---|
| Supply system flow |  | FIG. 1 | FIG. 1 | FIG. 3 | FIG. 3 |
| Supplied fluid |  | TEA | Water | TEA | Water |
| Pressure in tank (1) | MPaG | 0.30 | 0.30 | 0.30 | 0.30 |
| Pressure indicated by pressure gauge (7) | MPaG | 0.60 | 0.60 | 0.25 | 0.25 |
| Pressure indicated by pressure gauge (3) | MPaG | 0.55 | 0.55 | — | — |
| TEA flow rate (average flow rate) | kg/hr | 0.80 | 0.80 | 0.80 | 0.80 |
| Standard deviation of flow rate | kg/hr | 0.009 | 0.003 | 0.082 | 0.005 |
| Standard deviation with respect to average flow rate | % | 1.13 | 0.38 | 10.25 | 0.63 |
| Situation at the time of opening of vent 1 (after 6 hours) |  | Gas was absent | Gas was absent | Gas was present | Gas was absent |

As can be seen from the results of Examples 1 to 3 and Comparative Examples 1 to 3 in Table 1, according to the method of producing a polycarbonate of the present invention, triethylamine serving as a catalyst can be stably supplied. It is found that as a result of the foregoing, a reaction liquid (emulsion solution) having satisfactory separability is obtained. In addition, it is found that in each of Examples 1 and 2, a polycarbonate-polydimethylsiloxane copolymer having a low content of an unreacted polydimethylsiloxane is obtained. In contrast, it is found that in each of Comparative Examples 1 to 3, a reaction liquid (emulsion solution) having poor separability is obtained. As a result, in each of Comparative Examples 1 and 2, a polycarbonate-polydimethylsiloxane copolymer having a high content of an unreacted polydimethylsiloxane is obtained.

The results of Reference Examples 1 and 2 in Table 2 show that a fluctuation in flow rate of TEA is peculiar to the case where a pressurization gas, such as a nitrogen gas, is used for TEA, and the fluctuation occurs owing to a high gas solubility in TEA.

INDUSTRIAL APPLICABILITY

In the method of producing a polycarbonate of the present invention, the tertiary amine serving as the polymerization catalyst can be introduced into the reaction process while an amount of fluctuation in flow rate thereof is reduced. Accordingly, separability at the time of the separation of the reaction liquid (emulsion solution) obtained from the polycondensation step into the aqueous phase and the organic solvent phase containing the polycarbonate resin is improved, and hence the polycarbonate can be efficiently produced. In addition, when a polycarbonate-polyorganosiloxane copolymer is produced as the polycarbonate, a polycarbonate-polyorganosiloxane copolymer having a low content of an unreacted polyorganosiloxane can be produced. Therefore, according to the method of producing a polycarbonate of the present invention, when a polycarbonate is produced by using an interfacial polymerization method, a polycarbonate having stable quality can be obtained.

REFERENCE SIGNS LIST

1 TEA storage tank
2 TEA supply pipe
3 pressure gauge
4 pressure control valve
5 diluent solvent supply pipe
6 pump
7 pressure gauge
8 flowmeter
9 flow rate control valve
10 methylene chloride solution of TEA supplied from system of FIG. 1 or 3
11 methylene chloride solution of allylphenol terminal-modified polydimethylsiloxane 12 methylene chloride
13 methylene chloride solution of polycarbonate oligomer
14 static mixer
15 aqueous sodium hydroxide
16 reactor
17 aqueous solution of triethylamine
18 aqueous sodium hydroxide
19 aqueous solution of bisphenol A
20 methylene chloride solution of p-t-butylphenol
21 to 23 reactor

The invention claimed is:

1. A method of producing a polycarbonate, comprising:
introducing a tertiary amine as a polymerization catalyst into a reaction process; and
performing interfacial polycondensation between an alkali aqueous solution of a dihydric phenol and phosgene in the presence of an organic solvent,
wherein the tertiary amine is introduced into the reaction process so that the following (i) to (iii) may be satisfied:
(i) a portion into which the tertiary amine is introduced comprises at least a tertiary amine storage tank, a tertiary amine supply pipe, and a diluent solvent supply pipe from which a diluent solvent for the tertiary amine is supplied;
(ii) the portion further comprises a pressure control valve in the tertiary amine supply pipe on an upstream side of a merging portion with the diluent solvent supply pipe; and
(iii) when a pressure of an inside of the tertiary amine storage tank pressurized by a pressurization gas is represented by $P_1$ and a pressure in a portion ranging from an outlet of the storage tank to an upstream side of the pressure control valve is represented by $P_2$, a relationship of $P_1 \le P_2$ is satisfied.

2. The method of producing a polycarbonate according to claim 1, wherein the method of producing a polycarbonate comprises:
a step (a) of subjecting the alkali aqueous solution of the dihydric phenol and the phosgene to a phosgenation reaction in the presence of the organic solvent to provide a reaction liquid;
a step (b) of introducing the alkali aqueous solution of the dihydric phenol into the reaction liquid obtained from the step (a) to provide a reaction liquid containing a polycarbonate oligomer;
a step (c) of separating the reaction liquid containing the polycarbonate oligomer obtained from the step (b) into an aqueous phase and an organic solvent phase containing the polycarbonate oligomer; and
a step (d) of causing the organic solvent phase containing the polycarbonate oligomer separated in the step (c) and the alkali aqueous solution of the dihydric phenol to react with each other to provide a reaction liquid containing the polycarbonate.

3. The method of producing a polycarbonate according to claim 2, wherein the tertiary amine is introduced as the polymerization catalyst into the step (d).

4. The method of producing a polycarbonate according to claim 3, wherein the tertiary amine is further introduced as the polymerization catalyst into the step (b).

5. The method of producing a polycarbonate according to claim 1, wherein a purity of the tertiary amine in the tertiary amine storage tank is 90% or more.

6. The method of producing a polycarbonate according to claim 1, wherein the tertiary amine comprises triethylamine.

7. The method of producing a polycarbonate according to claim 1, wherein the diluent solvent comprises water or methylene chloride.

8. The method of producing a polycarbonate according to claim 1, wherein the pressurization gas comprises nitrogen or air.

9. The method of producing a polycarbonate according to claim 1, wherein a standard deviation of an amount of the tertiary amine supplied from the tertiary amine supply pipe is within 5% of an average flow rate thereof.

10. The method of producing a polycarbonate according to claim 1, wherein a concentration of the tertiary amine after mixing with the diluent solvent is 50 mass % or less.

11. The method of producing a polycarbonate according to claim 1, wherein the tertiary amine is transferred with a pump installed in the tertiary amine supply pipe at the outlet of the tertiary amine storage tank.

12. The method of producing a polycarbonate according to claim 2, wherein the step (d) comprises a step of causing the organic solvent phase containing the polycarbonate oligomer separated in the step (c), the alkali aqueous solution of the dihydric phenol, and a polyorganosiloxane to react with each other to provide a reaction liquid containing a polycarbonate-polyorganosiloxane copolymer.

13. The method of producing a polycarbonate according to claim 12, wherein the tertiary amine is introduced into the step (d) at a mass ratio of from 0.001 to 0.1 with respect to the polyorganosiloxane.

14. The method of producing a polycarbonate according to claim 1, wherein the dihydric phenol comprises a dihydric phenol represented by the following general formula (1):

wherein $R^{11}$ and $R^{12}$ each independently represent a halogen atom, an alkyl group having 1 to 6 carbon atoms, or an alkoxy group having 1 to 6 carbon atoms, V represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a fluorenediyl group, an arylalkylene group having 7 to 15 carbon atoms, an arylalkylidene group having 7 to 15 carbon atoms, —S—, —SO—, —SO$_2$—, —O—, or CO—, and a and b each independently represent an integer of from 0 to 4.

15. The method of producing a polycarbonate according to claim 12, wherein the polyorganosiloxane comprises at least one of polyorganosiloxane selected from the following general formulae (2), (3), and (4):

(4)

wherein $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, and a plurality of $R^3$, $R^4$, $R^5$ and/or $R^6$ may be identical to or different from each other, Y represents —$R^7$O—, —$R^7$COO—, —$R^7$NH—, —$R^7$NR$^8$—, —COO—, —S—, —$R^7$COO—$R^9$—O—, or —$R^7$O—$R^{10}$—O—, and a plurality of Y may be identical to or different from each other, the $R^7$ represents a single bond, a linear, branched, or cyclic alkylene group, an aryl-substituted alkylene group, a substituted or unsubstituted arylene group, or a diarylene group, $R^8$ represents an alkyl group, an alkenyl group, an aryl group, or an aralkyl group, $R^9$ represents a diarylene group, $R^{10}$ represents a linear, branched, or cyclic alkylene group, or a diarylene group, Z represents a hydrogen atom or a halogen atom, and a plurality of Z may be identical to or different from each other, β represents a divalent group derived from a diisocyanate compound, or a divalent group derived from a dicarboxylic acid or a halide of a dicarboxylic acid, p and q each represent an integer of 1 or more, and a sum of p and q is from 20 to 500, and n represents an average number of repetitions of from 20 to 500.

16. A method of producing a polycarbonate, comprising:
introducing a tertiary amine as a polymerization catalyst into a reaction process; and
performing interfacial polycondensation between an alkali aqueous solution of a dihydric phenol and phosgene in the presence of an organic solvent,
wherein a fluctuation in flow rate when the tertiary amine is introduced into the reaction process is within 5% in terms of a standard deviation with respect to an average flow rate of the tertiary amine.

* * * * *